United States Patent [19]

Stansbury, Jr.

[11] 4,276,695

[45] Jul. 7, 1981

[54] ROLLER MEASURE DEVICE

[75] Inventor: Benjamin H. Stansbury, Jr., Beverly Hills, Calif.

[73] Assignee: Ronco Teleproducts, Inc., Elk Grove Village, Ill.

[21] Appl. No.: 45,208

[22] Filed: Jun. 4, 1979

[51] Int. Cl.³ .............................................. G01B 3/12
[52] U.S. Cl. ................................................ 33/141 E
[58] Field of Search ........................ 33/141 E, 141 R; 15/143 R, 143 B, 144 B, 145

[56] References Cited

U.S. PATENT DOCUMENTS

| | | | |
|---|---|---|---|
| 1,877,061 | 9/1932 | Schroll | 33/141 R |
| 2,085,247 | 6/1937 | Bible | 33/141 R |
| 2,416,772 | 3/1947 | Reece | 33/141 R |
| 3,163,941 | 1/1965 | Presley | 33/141 R |
| 3,251,132 | 5/1966 | Hall | 33/141 E |
| 3,673,693 | 7/1972 | Evans | 33/141 R |
| 3,696,510 | 10/1972 | Evans | 33/141 R |
| 3,732,623 | 5/1973 | Bopst | 33/141 R |
| 3,791,038 | 2/1974 | Polydoris | 33/141 R |
| 3,835,543 | 9/1974 | Polydoris | 33/141 E |
| 4,163,323 | 8/1979 | Bud | 33/141 E |

Primary Examiner—Steven L. Stephan
Attorney, Agent, or Firm—Romney, Golant, Disner & Ashen

[57] ABSTRACT

An improved portable mechanical roller measure device for moving forwardly along a surface and thereby measuring a distance there along. The device comprises a housing which supports a rotatable wheel or roller. The rotation of the roller is transmitted through a simple symmetrical straight-toothed gear arrangement to a counter mechanism, which indicates the distance over which the device has traveled along the surface being measured. The roller measure device may be used in a hand-held fashion or may be connected to an elongated handle. The handle has an attachment section for detachably connecting to exterior attachment sections at either the rear or front of the housing so the device can either be pushed or pulled in its forward measuring direction. The housing and handle, and their respective attachment sections are preferably low cost molded plastic parts which are designed and configured for quick, easy interconnection and disconnection of the handle, high strength at the point of attachment, and added rigidity in the plane of movement of the device. The handle may be comprised of a plurality of releasably interlocked sections.

16 Claims, 18 Drawing Figures

ROLLER MEASURE DEVICE

The present invention relates to a measuring device and, more particularly, to an improved portable mechanical roller measure device having a housing on which a roller is rotatably mounted for measuring linear distance. The user may hold the housing and move it so that the roller rolls over the surface being measured, or, when an elongated handle is detachably connected to the housing, the user may operate the roller from a remote position such as by standing erect and moving the roller along the ground.

There have long been portable, mechanical roller measure devices wherein rotation of a roller or wheel along a linear surface to be measured provides a readout to the user indicating the length of the surface. See for example:

U.S. Pat. No. 437,065 (1890) to Wells
U.S. Pat. No. 1,718,052 (1929) to Lineaweaver
U.S. Pat. No. 1,877,061 (1932) to Schroll
U.S. Pat. No. 2,416,773 (1947) to Reece
U.S. Pat. No. 3,163,941 (1965) to Presley
U.S. Pat. No. 3,251,132 (1966) to Hall
U.S. Pat. No. 3,494,039 (1970) to Porter
U.S. Pat. No. 3,673,693 (1972) to Evans
U.S. Pat. No. 3,696,510 (1972) to Evans
U.S. Pat. No. 3,732,623 (1973) to Bopst
U.S. Pat. No. 3,781,038 (1974) to Polydoris
U.S. Pat. No. 3,835,543 (1974) to Polydoris
U.S. Pat. No. De. 167,496 to Chapman
British Pat. No. 1,095,655 to Caplin Wells U.S. Pat. No. 437,065 (1980) shows a basic roller measure device. It includes a generally rectangular box-shaped housing having a protruding roller mounted on a horizontal transverse axis. A series of gear wheels mounted on horizontal axes parallel to the roller axis provide a visual readout at the side of the housing. No handle is shown.

Lineaweaver U.S. Pat. No. 1,718,052 (1929) shows a generally circular housing having a protruding roller on a horizontal axis. The roller drives gearing on parallel axes to provide a visual readout at the side of the housing. A short handle is screwed into the top of the housing.

Schroll U.S. Pat. No. 1,877,061 (1932) shows a box-like housing having a protruding roller, a counter with a visible readout and intermediate gearing. No handle is shown.

Reece U.S. Pat. No. 2,416,773 (1947) shows an inverted generally pear-shaped pilotage rotameter for map measuring and computing information; a roller drives gearing mounted on parallel axes to provide readout at the side. No handle is shown.

Chapman U.S. Pat. No. De. 167,496 (1952) shows a roller measuring device having the general appearance of a caster or roller for furniture.

British Patent to Chaplin British Pat. No. 1,095,655 (1965) shows a roller measuring device having a folding handle.

Presley U.S. Pat. No. 3,163,941 (1965) shows a protruding roller which drives gearing on parallel axes to provide a readout at the side of the device. No handle is shown.

Hall U.S. Pat. No. 3,251,132 (1966) shows a measuring device wherein a counter is disposed within a housing that is provided with an elongated handle. A large roller is provided externally at one side of the housing and transmits motion to the counter within the housing.

Porter U.S. Pat. No. 3,494,039 (1970) shows an elongated upright generally cylindrical map scaling device having a roller at its lower end for moving over a map; the roller drives gearing mounted on parallel axes to provide readout at the side of the device. No handle is shown.

Evans U.S. Pat. No. 3,673,693 (1972) and Evans U.S. Pat. No. 3,696,510 (1972) both show structures similar to that shown in Hall.

Bopst U.S. Pat. No. 3,732,623 (1973) shows a generally rectangular box-like housing having a protruding roller with an endless tape drive operated by the roller to provide the measurement readout. No handle is shown.

Polydoris U.S. Pat. No. 3,791,038 (1974) shows a generally box-like housing having a protruding roller, a counter mechanism with a visible readout, and intermediate gearing which includes a pair of inter-meshing bevel gears. An elongated handle has a threaded stud at its lower end which may be screwed into a threaded nut encased at the rear of the housing for pushing the device. Polydoris U.S. Pat. No. 3,835,543 (1974) shows a like structure.

The present invention provides an improved, simple, inexpensive, portable mechanical roller measure device. It is preferably comprised of simple, low cost molded plastic parts. In its preferred illustrated form, this device utilizes symetrically arranged, simple straight-tooth transfer gearing between the roller and the counter mechanism. This reduces cost of manufacture and problems of malfunction. It also avoids damaging the device if it is operated inadvertently in reverse. The illustrated device also includes an elongated attachable handle which releasably connects to exterior attachment sections on the roller measure device housing. The attachment sections are provided at both the rear and front of the housing so that the device can be pushed or pulled forwardly as for measuring into or out of a corner. The illustrated elongated handle has an economical open generally X-shaped cross section which is more resistant to bending in one direction; it attaches to the housing in a predetermined orientation (as viewed transversely of the axis) to provide the greater resistance to bending in the vertical plane of movement of the device. The handle and attachment sections are uniquely configured and constructed for strength and durability as well as for easy, fast, yet reliable, attachment and detachment of the handle to and from the housing. The elongated handle may be comprised of multiple segments which detachably interengage for convenient manufacture, packaging and storage.

Thus, it is a primary object of the present invention to provide a rugged, reliable, yet inexpensive, portable, mechanical roller measuring device for measuring linear distance.

It is another object to provide such a measuring device utilizing symmetrically arranged simple straight-tooth gearing on parallel and perpendicular axes for ease and economy of manucture and assembly and reliable, trouble-free operation.

It is still another object to provide such a simplified transmission measuring device which may permit operation in the reverse direction without harming the device.

It is a further object to provide such a measuring device with a readily detachable handle which may be attached either to the front or the back of the device for pulling or pushing the device from or into corners or the like.

It is still a further object to provide such a measuring device and a detachable handle having a low cost molded construction that provides different rigidity in different directions, with the handle being attached to the housing in an orientation which places the maximum resistance to stiffness of the handle in the usual plane of movement of the device.

It is another object to provide such a measuring device and a readily detachable handle wherein the housing of the device has a strong, effective but inexpensive exterior attachment projection to interengage with the handle.

It is a more particular object to form such exterior attachment projection by combining thinner sections from each of molded housing halves to provide a relatively high strength attachment member without increased molding cost.

It is another object to provide such a device and handle comprised principally of relatively low cost, simple yet durable and effective molded plastic parts.

It is a further object to provide such a measuring device with a segmented handle wherein the segments are easily, quickly and effectively locked and unlocked from one another for effective use and convenience of manufacture, packaging, shipment and storage.

It is a further object to provide such a measuring device wherein the mesh of certain gears is partially non-aligned to permit use of lower cost, lower tolerance gears which may have unremoved parting-line flashing.

PREFERRED EMBODIMENT OF THE INVENTION

Figures 1, 2, 9, 12, 13, 14, 15, 16, 17, 18:
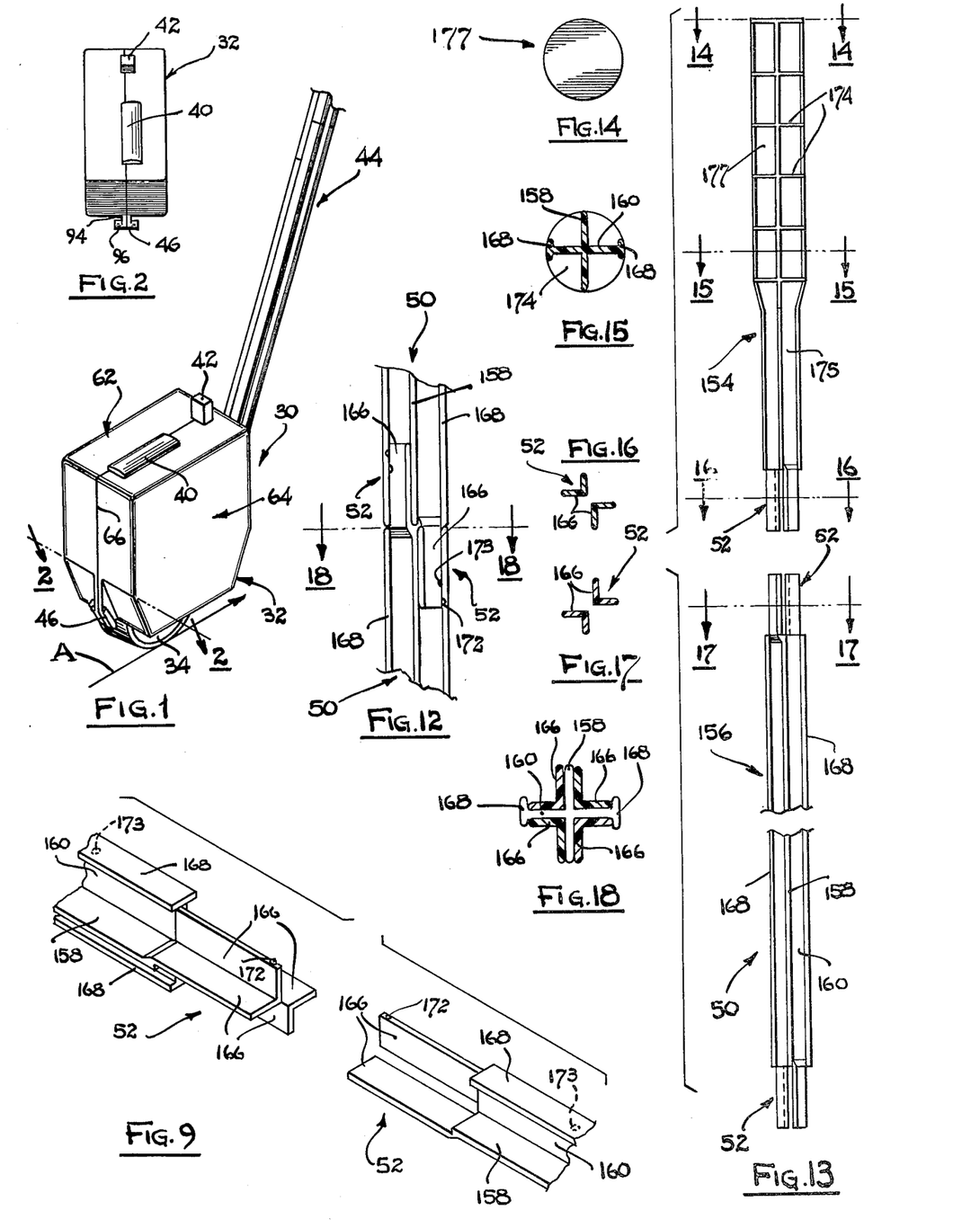
FIG. 1 is a perspective view of a roller measure device in accordance with a presently preferred form of the invention.
FIG. 2 is a view as seen generally along line 2—2 of FIG. 1.
FIG. 9 is an enlarged perspective view of interengaging end portions of segments of the handle.
FIG. 12 is a view of end portions of handle segments in their interconnected interlocking position.
FIG. 13 is an elevational view, partially broken away, of the handle upper and intermediate segments.
FIGS. 14, 15, 16 and 17 are transverse sectional views taken along lines 14—14, 15—15, 16—16 and 17—17, respectively of FIG. 13.
FIG. 18 is a transverse sectional view taken generally along line 18—18 of FIG. 12 showing the interconnection of adjacent handle segments.
Figures 3, 4, 5, 11:
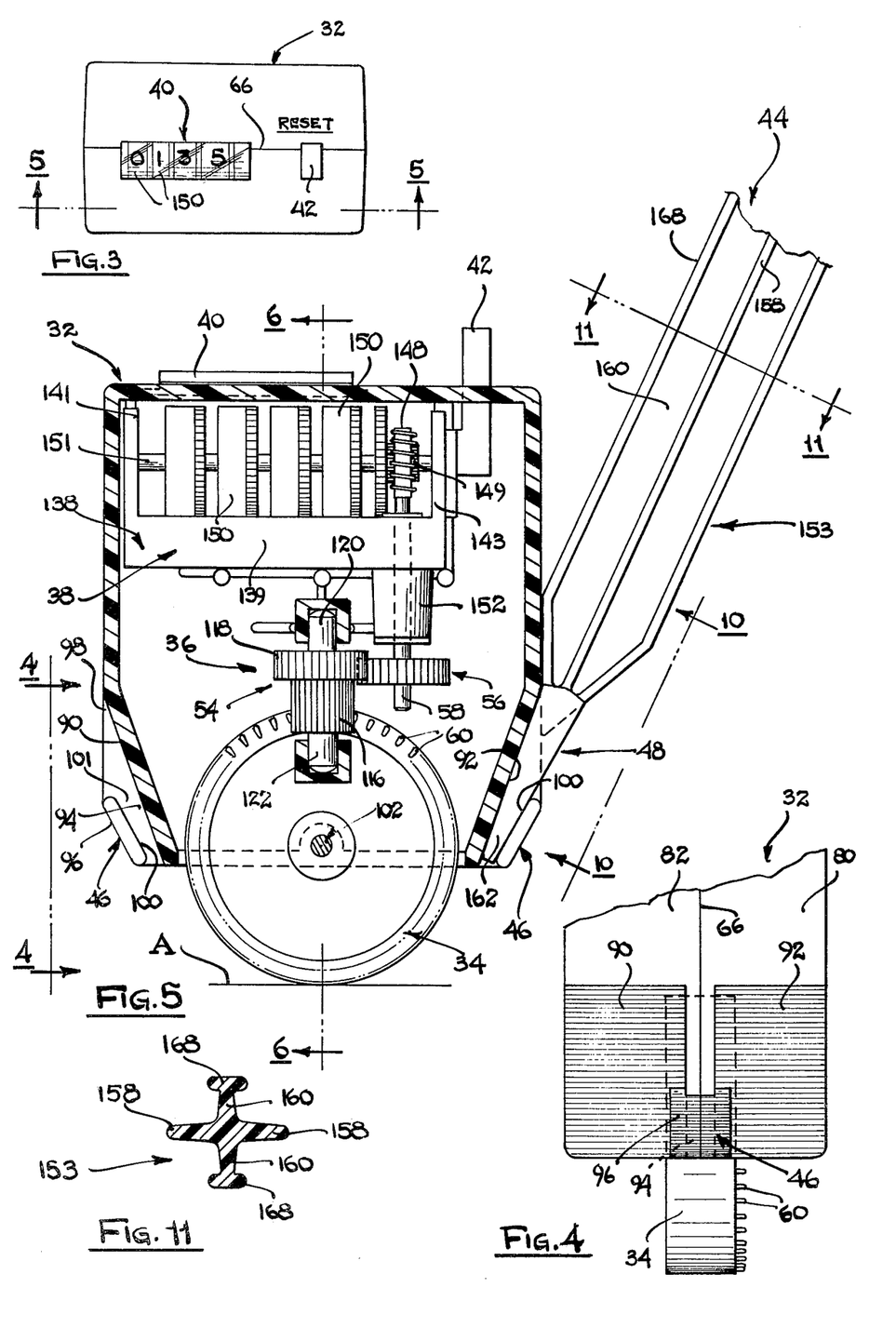
FIG. 3 is an enlarged top plan view of the device.
FIG. 4 is an enlarged rear view of the lower portion of the device as seen generally along line 4—4 of FIG. 5.
FIG. 5 is a side sectional view of the device taken along line 5—5 of FIG. 3.
FIG. 11 is a transverse cross-sectional view of the lowermost handle segment taken generally along line 11—11 of FIG. 5.

The drawings show a presently preferred embodiment of a roller measure device 30 in accordance with the present invention. Broadly, as shown in FIG. 1, the illustrated roller measure device 30 comprises a portable handle-holdable housing 32 which rotatably supports a roller 34 for forward movement along a linear surface A to be measured. As shown in FIG. 5, the roller extends out of the bottom of the housing and engages the surface A. As the device is moved linearly along the surface, the roller is rotated and it transmits motion through straight-tooth gear means 36, which in turn transfers motion to a counter mechanism 38. The straight-tooth gear means 36 comprises straight gear teeth 60 on the roller, straight-tooth double transfer gear or gear means 54, and a straight-tooth single transfer gear or gear means 56 on the input shaft of the counter mechanism. The transfer gear means 54 and 56 and the counter mechanism 38 are located within the housing 32 as seen best in FIG. 5. A readout from the counter mechanism 38 is provided at a window 40 at the top of the housing. The counter mechanism 38 includes means for resetting it to zero after each use, and this means includes a button 42 which extends through the top of the housing and may be depressed by the user to reset the counter mechanism 38. The device 30 records distance traveled when it is moved in a forwardly direction indicated by the arrow in FIG. 1. This movement may be achieved by either pushing or pulling the device; which may be accomplished by holding the device in the hand of the user or through means of a detachable handle.

The illustrated handle 44 is shown attached to the housing 32 in FIGS. 1 and 5 in position for pulling the device in the forwardly measuring direction. The releasable attachment between the handle 44 and the housing 32 is achieved between an external attachment projection means 46 at the lower front of the housing 32 which interengages with handle attachment means 48 at the lower end of the elongated handle 44. It will be noted that external attachment projection means 46 are also provided at the rear of the housing so that the handle 44 can be attached at the rear end to push as well as pull the housing 32. This can be particularly advantageous when measuring to or from corners or the like. For example, the device 30 can be pulled from a corner and then the handle 44 can be switched so that the device 30 can continue and be pushed into a corner at the opposite end of the distance to be measured. Similarly, it may be convenient to pull the device 30 in its forward direction from a corner for a predetermined distance as shown by the counter mechanism. Such tasks are not as readily accomplished when the handle 44 is always at the rear for pushing the device 30 in its forwardly direction. It can also be noted that the illustrated handle 44 attaches to the housing 32 in a predetermined orientation relative to the axis of the handle. This permits the handle 44 to be designed with a minimum of material and thus at reduced cost, while providing adequate stiffness and resistance to bending in a generally vertical central plane which extends front to rear and generally bisects the device. There is less concern about bending of the handle in the transverse directions, and therefore, the design can permit a degree of such transverse bending.

The illustrated handle 44 is comprised of a plurality of readily separable and mostly interchangeable sections 50 for ease of manufacture, as well as packaging, storage and shipment. Further, each of the illustrated sections has interengaging means 52 so that when the sections 50 are assembled together they are effectively interlocked and will not readily come apart from one another, while at the same time they may be readily disengaged when desired to disassemble the sections of the handle 44.

The illustrated double transfer gear 54 is a single molded plastic part which has two adjacent straight-tooth gear sections 116, 118. The double transfer gear 54 is rotatable about an upright axis which is generally perpendicular to and intersects the transverse axis of rotation of the roller. One section 116 of the double transfer gear 54 engages the roller teeth 60. The other section 118 of the double transfer gear 54 engages the single transfer or input gear 56 of the counter mechanism 38. The axis of that gear 56 is generally parallel to the axis of the double transfer gear 54. The use of such straight tooth gears on parallel axes provides efficient, relatively trouble-free transmission of rotation; it also permits relatively low cost manufacture with relatively high tolerance levels for the gears and their mounting means and for economical assembly of the gears in the device 30. Further, there is minimum likelihood of problems of misalignment, jamming and the like which tend to result if the axes of the transmission system are at different angles or are askew to one another. Further, having the axis of the double transfer gear 54 intersect and be perpendicular to the axis of rotation of the roller 34, permits engagement of the straight teeth of the double transfer gear 54 with the roller teeth 60 extending around the periphery of the roller 34 in an area where the movement of the roller teeth 60 is essentially transverse to the double transfer gear axis; this minimizes distortion or the occurrence of disengaging forces between the roller teeth 60 and the double transfer gear 54. The simple straight-toothed arrangement also permits the roller 34 to be rotated in the opposite direction without damaging the device 30.

Now considering the illustrated portable mechanical roller measure device 30 in further detail, the housing 32 is generally rectangular and hollow. As viewed in FIG. 1, the housing 32 is made up of a pair of mating halves, a left half 62 and a right half 64, joined together along a vertical central parting line 66. The housing 32 may be made of any suitable material. The illustrated housing 32 is made of a molded plastic such as polycarbonate, styrene or ABS. Each half comprises a generally rectangular side wall section 68, 70, a top wall section 72, 74, a bottom wall section 76, 78, a rear wall section 80, 82 and a front wall section 84, 86. There is a cutout in the top wall sections as seen in FIG. 1 for the transparent window 40 which may be made of glass, clear plastic or other suitable material. There is also a cut out in the top wall sections for the reset button 42 of the counter mechanism 38. It will be noted that the window 40 and the reset buttom 42 are slightly to the right of the parting line 66 so that a larger portion of each is in the right half top wall section 74. This may also be seen from FIGS. 7 and 8 which are perspective views of the housing halves. As shown in those figures, and particularly in FIG. 5, there is an elongated generally rectangular opening 88 formed in the bottom wall sections. This opening is slightly longer than the diameter of the roller 34 so that the roller 34, when it is rotatably mounted in place, will extend through that opening 88 in the illustrated device 30. As can be seen, slightly less than half of the roller 34 extends through the opening 88. The lower portion of the rear wall sections 80, 82 form inwardly and downwardly inclined rear wall sections 90. The lower portions of the front wall sections 84, 86 form inwardly and downwardly inclined front wall sections 92. The inclined rear wall sections 90 support one of the exterior attachment means 46 in the form of an integrally connected rear projection. The inclined front wall sections 92 support the other exterior attachment means 46 in the form of an integrally connected front projection. Each projection 46 is formed generally centrally of the device 30 with a portion of each projection being contributed by and integral with each of the molded housing halves. Each projection 46 includes a generally vertical base portion 94 which extends outwardly from the adjacent inclined wall sections 90, 92 and a transversly extending retainer portion 96 which projects outwardly to either side from the outward edge of the base portion. As seen best in FIG. 5, each base portion 94 has an outward vertical edge 98 which comprises a continuation of the outer surface of the adjacent front 84, 86 or rear wall sections 80, 82 and a lower edge which comprises a continuation of the outer surface of the adjacent lower or bottom wall sections 76, 78. For each projection, the vertical and horizontal edges 96, 98 discontinue before intersecting and are joined by an inclined angle edge 99 and the transverse retainer portion 96 extends along this angle edge. It will be noted particularly from FIG. 5 that each of the interior surfaces 100 of the retainer portions 96 is at an angle to the outer surface of the adjacent inclined wall sections 90, 92 and spaced therefrom to form a generally pie or wedge shaped opening 101. One such opening 101 is provided at either side of each of the base portions 94 of the projection 46. These wedge shape openings 101 converge in the downward direction. Each of the exterior projections 46 is adapted to mate and interengage with the attachment means 48 on the handle 44 as will be described below. It will be noted that the projections 46 have their thin or base portions 94 each formed by the joining together of one-half integrally molded with one of the housing halves and the other half integrally molded with the other of the housing halves. This joining may be accomplished by any suitable means such as sonic welding. This combining of two thinner sections provides extra strength at the projection where the handle is connected, without having to mold a thicker section which would require longer molding time per part and increase molding cost.

Figure 6:
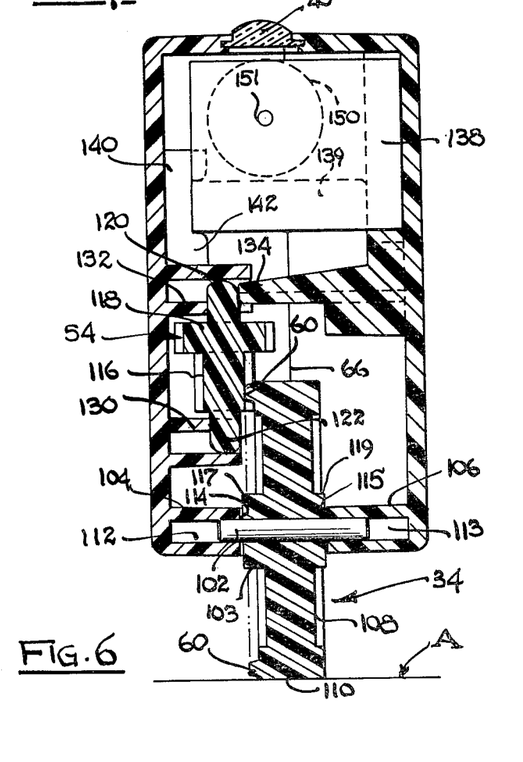
FIG. 6 is a transverse sectional view of the device taken generally along line 6—6 of FIG. 5.

As noted above, the housing 32 contains and supports within it the counter mechanism 38, the transfer gear means 36 and the roller 34. As best shown in FIGS. 5 and 6, the roller 34 is mounted and secured to a shaft 102 or pin which extends outwardly from either side of the roller, being secured within a central hub portion 103 of the roller. The roller 34 also includes an intermediate portion 108 outwardly of the hub portion and a peripheral or edge portion 110. The roller teeth 60 are formed on the left hand side face (as viewed in FIG. 6) of the roller 34 at spaced intervals there around. The roller gear teeth 60 have a generally straight tooth configuration as shown in FIG. 5.

Figure 7:
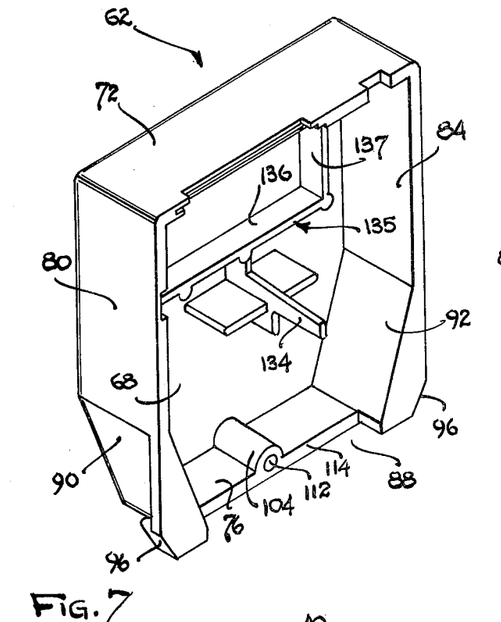
FIG. 7 is an isometric view of the interior of the left hand housing half.
Figure 8:
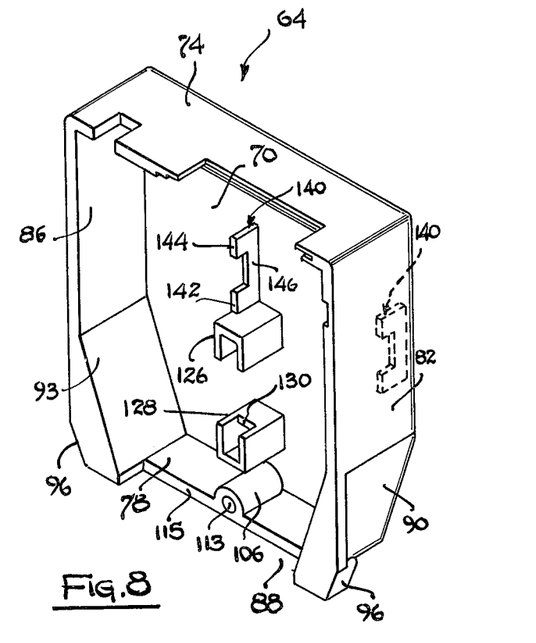
FIG. 8 is an isometric view of the interior of the right hand housing half.

The housing 32 is formed with means to rotatably support the roller as shown best in FIGS. 6, 7 and 8.

Each of the housing halves is provided at the center of each lower wall section 76, 78 with an enlargement 104, 106 defining a cylindrical bearing opening 112, 113 for the receipt of one of the ends of the roller shaft 102. The inward edges 114, 115 of these enlargements 104, 106 provide limits for the outer surfaces 117, 119 of the roller hub portion 103 to define the position of the roller 34 in the housing and relative to the transfer gear means 36. It is therefore not necessary that the position of the roller 34 be determined by the precise location of the roller shaft 102 relative to the roller 34 or by the position of the roller shaft 102 in the housing bearing openings 112, 113. Thus, in assembly of the roller shaft 102 on the roller 34, it may simply be pressed into the central opening in the roller hub portion 103 so that a portion of the shaft 102 extends outwardly beyond either side of the roller hub portion 103. When the housing halves 62, 64 are assembled with the roller shaft ends extending into the bearing openings 112, 113, there will normally be clearance between both ends of the roller shaft and the inner ends of the bearings openings, with the transverse location of the roller 34 being determined as noted above. This permits relatively quick, easy and economical assembly of the roller 34 in the housing.

As shown in FIGS. 5 and 6, the roller gear teeth 60 engage the teeth of the double transfer gear 54, which communicates with the single transfer gear 56. The illustrated double straight tooth transfer gear 54 and single straight tooth transfer gear 56 may each be a single part made from suitable material such as relatively low cost molded plastic such as nylon or acetal. The illustrated double transfer gear 54 has a lower or first section 116 of straight gear teeth which mesh with the roller gear teeth 60, and it has a second or upper gear section 118 of straight gear teeth which mesh with the single transfer gear 56 attached to the counter mechanism 38. The first gear section 116 has a fewer number of teeth than the second gear section 118 to multiply the rotation imparted to the counter mechanism 38. The illustrated double transfer gear 54 has upper 120 and lower shaft ends 122, and, as noted above, it is mounted for rotation about an axis which is parallel to and intersects the axis of rotation of the roller 34. The double transfer gear 54 is mounted on supports 126, 128 within the housing halves 62, 64. The supports of the illustrated device are integrally formed and molded within the housing halves 62, 64, The right hand housing half 64 shown in FIG. 8 shows the generally box-like open, supports, namely the upper support 126 and the lower support 128. The lower support 128 is generally box shaped and extends outwardly from the center inside of the side wall section 70 of the housing half 64. The lower support 128 includes a pair of side walls, a lower wall and an upper wall 130, and it is open on its inward end. The upper wall 130 of the lower support 128 has a cutout at its inner end whereby the lower shaft end 122 of the double transfer gear 54 may be received in the lower support 128 as generally shown in FIGS. 5 and 6. The upper support 126 is similar to the lower support 128, being spaced above it and in line with the central roller axis, except that the cutout in the upper support 126 is in the bottom wall 132 so that it can receive the upper shaft end 120 of the double transfer gear 54. The other or left hand housing half 62 shown in FIG. 7 includes an inwardly extending centrally located finger 134 which is disposed, when the housing halves 62, 64 are assembled as shown in FIG. 6, to cooperate with supports 126, 128 and with the roller 34 to hold the double transfer gear 54 in place. The associated single transfer gear 56 is press fit onto the lower end of the counter mechanism input shaft 58 to determine its position.

The left half housing 62 also includes an inwardly projecting support enclosure 135 for the counter mechanism 38. This support enclosure 135 includes a generally horizontal lower wall 136 and a vertically extending rear wall 137. As shown in FIGS. 5 and 6, the counter mechanism 38 has a generally rectangular open frame 138 having a lower horizontal base section 139, an upright forward section 141, and an upright rearward section 143. When the device is assembled, the left end of the counter mechanism frame 138 is received in and supported by the enclosure 135. The right half housing 64 shown in FIG. 8 includes a pair of inwardly extending generally C-shaped holding portions 140 which engage the counter frame 138 as shown in FIG. 6 to support and hold the counter frame 138 in a correct position. Each of the C-shaped holding portions 140 include a lower finger 142 and a upper finger 144, as well as an intermediate portion 146. As shown in FIG. 6, the lower fingers 142 support the left hand underside edge of the frame 138. The intermediate portions 146 engage the left hand edge of the frame base section 139 to maintain its position transversely, and the upper fingers 144 extend above the left hand edge of the frame base section 139. The construction of the counter mechanism 38 will not be discussed in detail since it is well known in the art. In general, it includes the input shaft 58 on which a worm input gear 148 is mounted at its upper end. This worm gear 148 engages the counter gear 149 which imparts rotation to a series of number wheels 150 to thereby indicate the distance which the device 30 has traveled. The reading on these wheels 150 is visible through the window 40 as shown in FIG. 3. The wheels 150 are mounted on a main counter shaft 151 which is generally horizontal and extends front to back of the device, being supported between the front and rear frame sections 141, 143. The input shaft 58 of the counter mechanism 38 extends generally vertically and is parallel to the axis of the transfer gear 54. It is also generally perpendicular to the axis of the counter mechanism shaft 151 as well as to the axis of the roller 34. The input shaft 58 of the counter mechanism 38 extends through a downwardly extending hub 152 secured to the underside of the counter frame 138. The lower end of the input shaft 58 extends outwardly of that hub 152 and has secured on it as previously noted the single straight-tooth transfer gear 56. Also noted above, the single transfer gear 56 meshes with the upper second section 118 of the transfer gear 54. It can be seen in FIG. 5 that the single transfer gear 56 is disposed lower than the mating second section 118 of the double transfer gear 54 so that there is a lower portion including the lower edge of the single transfer gear 56 and an upper portion including the upper edge of the double transfer gear section 118, which are not in engagement with each other. This intentional misalignment of these gears permits each of these gears to be formed with flashing from the molding process or other imprecision in that portion of the gear contour. This permits such gears to be produced at a lower cost.

The illustrated roller 34 may be molded of a suitable plastic material such as urethane or ethylene vinyl acetate (EVA). Other constructions and/or materials may be utilized, however, it has been found that utilization of such molded plastic parts produce an effective, durable, yet low cost product.

As noted above, the simple straight tooth gearing arrangement permits the roller to be rotated in the reverse direction without causing any damage to the parts of the device as could be the case with other types of construction.

The counter mechanism 38 includes a resetting feature which is also well known in the art. After a distance has been measured and is indicated on the counter mechanism number wheels 150, the reset buttom 42 may be depressed to thereby return the number wheels 150 to a neutral or zero reading.

The roller 34, gears 54, 56 and counter mechanism 38 are so contructed and arranged to cooperate so as to provide the appropriate reading on the number of wheels 150 indicative of the distance which the device 30 has traveled.

As noted above, the device 30 may be grasped in the hand of the user and moved along the surface A to be measured or the handle 44 may be attached and the device 30 may be operated from a remote position as by the user standing erect and using the handle 44 to move the measuring device 30 along the surface A. As also noted above, the handle 44 may be attached to either the front or the rear of the device 30 for either pulling or pushing the device 30 in its forward measuring direction as designed by the user for a particular measurement or series of measurements.

The illustrated handle 44 incorporates various unique features. As noted above, the handle 44 comprises a series of inter-connectable sections: namely, a lower attachment section 153, an uppermost grasping or handle section 154, and one or more intermediate sections 156. The handle 44 could be comprised of various suitable materials. The illustrated handle 44 is made from molded plastic parts which provide a relatively rigid, durable, lightweight, economical structure. Suitable plastic materials for the handle include ABS, SAN, highimpact styrene, glass filled polypropylone. In general, the illustrated handle 44 is X-shaped in cross-section as shown in FIG. 11, having an upstanding or vertical beam portion 160 and a transverse beam portion 158. As will be explained more fully, this configuration provides the requisite stiffness and stability to handle 44 while permitting the utilization of a minimum amount of material and the attainment of a relatively low cost for the handle construction.

Figure 10:
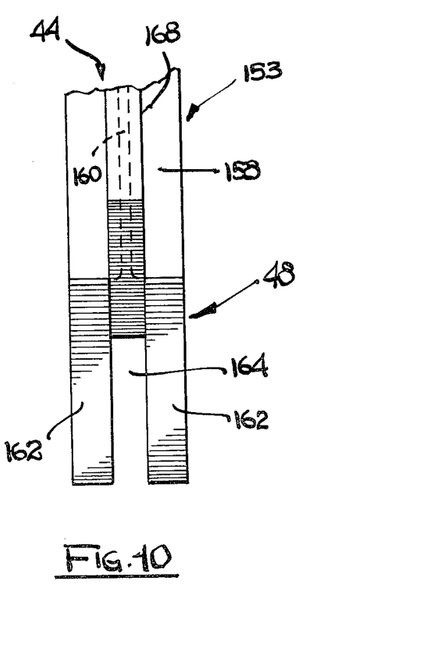
FIG. 10 is an enlarged view of the handle attachment means at the lower end of the handle as seen generally along line 10—10 of FIG. 5.

The lowermost or attachment section shown in FIGS. 5 and 10 has the handle attachment means 48 at its lower end for detachably inter-engaging with the external housing attachment means 46 described above at the front and rear ends of the housing to detachably secure the handle 44 in operative position relative to the housing 32 of the device 30. The handle attachment means 48 comprises generally a pair of spaced apart tapered prongs 162 which extend generally axially of the attachment section and define a receptacle 164 between them as shown in FIG. 10. The prongs 162 have a greater height at their upper ends and taper down to a lesser height at their lower ends. When the handle attachment means 48 is engaged with one of the exterior housing attachment means 46 as shown in FIG. 5, the central base portion 94 of the housing attachment means 46 is received in the receptacle 164. Further, the prongs 162 extend at either side of the base portion 94 and each of the prongs 162 is received in one of the tapered areas 101 defined between the external surface of the inclined housing wall sections 90, 92 and the interior surface 100 of the adjacent transverse retaining portion 96 of the housing attachment projection 46. When the handle and housing attachment means 46 are inter-connected as shown in FIG. 5, the transverse retaining portions 96 confine and restrict movement of the prongs 162 away from the housing 32. Further, because of the tapered configurations of the prongs 162 and of the areas 101 in which they are received on either side of the projection base portion 94, the prongs 162 may be received in a wedge fit. In this connection, the parts may be proportioned to accommodate slight variations in configuration and tolerance so that such wedge fit can be achieved; as seen in FIG. 5, some clearance space remains between the outside front wall of the housing and the adjacent portion of the handle.

It will be noted that the handle sections are symmetrical in cross-section so that either edge of the vertical beam portion 160 may be uppermost. It is important to note, however, that the arrangement of the inter-connecting housing and handle attachment means 46, 48 always maintains the vertical beam portion 160 of the handle 44 in a generally vertical orientation as seen in FIG. 11. The vertical beam handle portion 160 includes a reinforcing flange 168 at each of its outer edges. The transverse beam portion 158 does not have such a reinforcing flange. Thus, when the handle 44 is connected to the housing 32, the reinforced vertical beam portion 160 is necessarily in the generally vertical orientation, and the handle 44 is reinforced against bending in that generally vertical plane bisecting the housing 32 front to back. This limits bending or swaying of the handle 44 in that plane as the device 30 is moved forwardly. Such limited reenforcement is adequate since the device will generally be operated in a straight-line forward or rearward movement, and the absence of the reinforcement on the transverse beam portion 158 permits use of less material, and, therefore, results in lower cost.

The lower-most handle attachment section 153 has inter-connecting means 52 at its upper end. Such means 52 are identical with the inter-connecting means 52 at either end of the intermediate handle sections 156 and at the lower end of the uppermost grasping handle section 154. Such inter-connecting means 52 for the handle 44 will be described in detail in connection with the intermediate sections 156 and grasping handle section 154.

An intermediate section 156 is shown in FIG. 13, and end portions of such sections are shown in FIGS. 9, 12, 16 and 17. It will be noted that the intermediate sections 156 have the same general X-shape cross-section, with a vertical beam portion 160 having a reinforcing flange at the lower and upper edges and a transverse beam portion 158 without such reinforcing.

Each of the inter-connection means 52 comprises a pair of elongated L-beam finger tabs 166 which extend outwardly from the end of the handle section. These L-beam finger tabs 166 for each inter-connection means are arranged as shown in FIGS. 9, 16 and 17 with their apexes facing each other; the apexes are spaced apart sufficiently to receive between them the X-shaped end of the handle section being inter-connected with, as shown in FIGS. 12 and 18 in particular. Similarly, to the lower attachment section 153, the intermediate sections 156 and the grasping section 154 can inter-connect with either edge of the vertical beam portion 160 uppermost but with that vertical beam portion necessarily in a generally vertical orientation to provide the desired reinforcement in the vertical plane as discussed above.

As seen in FIGS. 12 and 18, each of the finger tabs 166 assumes a position in the interconnected assembled condition adjacent to half of the vertical beam portion 160 and half of the transverse beam portion 158 of the adjacent handle section. In addition, the edge of each L-shaped finger tab 166 adjacent a vertical beam portion 160 is received within the outwardly extending reinforcing flange 168 at the outer edge of that vertical beam portion. In this way, any tendency of the somewhat flexible plastic handle sections to bend or flex in the generally vertical mid-plane are limited by the engagement of the finger tab edges with the adjacent undersides of the vertical beam reinforcing flanges.

To maintain the handle sections in their assembled condition, interlocking means are provided. In the illustrated structure these take the form of a small projection 172 at the end of the edge of each finger tab 166 which will underlie a vertical beam reinforcing flange 168, and a like small projection 173 on the adjacent undersides of the reinforcing flanges 168. As shown in FIG. 12, these projections 172, 173 are positioned so that when the handle sections are fully interconnected, these projections have moved past one another to form a positive mechanical interlock to restrict inadvertent disassembly of the handle sections. The molded plastic handle sections have sufficient resiliency and the projections are positioned, proportioned, and arranged to permit them to pass by cne another when sufficient force is applied in either assembling or disassembling the handle sections. Thus, one of the inter-connecting handle means comprising a pair of the L-beam finger tabs 166 and the associated projections 172, 173 are provided at the upper end of the handle 153 attachment section, at either end of each of the intermediate handle sections 156, and at the lower end of the handle grasping section 154.

The handle grasping section 154 has a lower portion 175 with generally the same X-shaped cross-section as the intermediate sections 156. As shown in FIG. 13, an upper grip portion 177 of the grasping handle section 154 is somewhat enlarged, and it may incorporate a series of circular reinforcing discs 174 as shown in FIGS. 14 and 15. These discs 174 may be provided at spaced intervals along the axial length of the grip portion 177 of the grasping section 154. This construction facilitates the user having a firm, solid, grip while at the same time achieving economies from reduced material usage, convenience of mold/construction, etc.

Various changes and modifications may be made in the illustrated structure without departing from the spirit and scope of the present invention as set forth in the following claims.

What is claimed is:

1. A portable mechanical roller measure device having a detachable segmented handle for measuring a distance along a surface from a remote position, said device comprising:
   (a) a portable housing;
   (b) a roller rotably mounted in said housing and having a portion protruding outside of said housing for engaging and rolling along the surface along which the distance is to be measured when the housing is moved along said surface;
   (c) a resettable counter mechanism in said housing for providing a visual readout to the user of the device;
   (d) transfer means for transmitting rotation of said roller to said counter mechanism so that said readout indicates the distance over which said roller has travelled;
   (e) housing attachment means on said housing;
   (f) an elogated handle means having handle attachment means at one end for releasably engaging and attaching to said housing for moving said housing along the surface having the distance to be measured from a position remote from said surface, said handle comprising a plurality of releasably interconnected elongated sections each having in cross section a generally vertical beam portion and a generally horizontal beam portion, said vertical beam portions being reinforced against deformation in the vertical plane of said vertical beam portions, and said elongated handle sections each including interconnection means at their ends for interconnecting with like means on the ends of other elongated handle sections, said interconnection means each comprising a pair of axially extending finger tabs, wherein said handle sections are each a single molded plastic part and the vertical beam portion of each of said molded plastic handle sections is reinforced by means of an integrally formed transversely extending flange along at least one longitudinal edge of such vertical beam portion; and
   (g) locking means for physically but releasably locking interconnection means on one handle section to interconnection means on an adjacent handle section, wherein said locking means comprise mating pairs of projections, one on each of the interconnected interconnection means, said mating pair of projections being axially aligned when their respective handle sections are assembled together to limit disassembly of said handle sections, at least said finger tabs being sufficiently resilient to permit said projections to be forced past one another incident to assembly and disassembly of said handle sections with one another.

2. A roller measure device as set forth in claim 1 wherein said finger tabs are generally L shaped in cross-section and disposed with their apexes pointing at but spaced from one another.

3. A portable mechanical roller measure device as claimed in claim 1 wherein:
   said roller is rotatably mounted in said housing for rotation about a first axis, said roller having a series of generally straight gear teeth disposed around its periphery, and the distance travelled along said surface being perpendicular to said first axis;
   said resettable counter mechanism has a straight-toothed input gear rotatable about a second axis which is generally normal to and offset from said first roller axis; and
   said transfer means includes a straight-toothed transfer gear means that is engaged with said roller teeth and with said counter mechanism input gear so as to transmit rotational movement of said roller to said counter mechanism, said transfer gear means being rotatable about a third axis which is generally normal to and intersects said roller axis, said second and third axes being generally parallel to one another.

4. A roller measure device as set forth in claim 3 wherein said housing has a top wall and said visually readable measurement indication of the distance travelled is provided at said top wall, said first roller axis being generally horizontal and said second and third axes being generally vertical.

5. A roller measure device as set forth in claim 3 wherein said transfer gear means comprises a first gear section engagable with said roller gear teeth and a second gear section engagable with said counter mechanism input gear, said second transfer gear section having a greater number of teeth than said first gear section.

6. A roller measure device as set forth in claim 5 wherein said transfer gear means comprises a single molded plastic part comprising said first and second gear sections adjacent one another and a pair of opposed outwardly extending shaft sections.

7. A roller measure device as set forth in claim 1 wherein said housing is comprised of a pair of mating side sections joined together along a generally central vertical plane.

8. A roller measure device as set forth in claim 7 wherein said housing sections are each molded plastic parts and each include mating integrally formed support means extending inwardly from the inside of the housing sections into the interior area of the housing to support said roller, said transfer gear means, said counter mechanism, and said input gear.

9. A roller measure device as set forth in claim 1 wherein said counter mechanism input gear and said transfer gear means engagable with said input gear are molded plastic parts and are offset from one another in the direction of their axes so that, as measured in the axial direction, one end of said input gear and one end of said transfer gear means which meshes with said input gear are not in engagement with one another.

10. A roller measure device as claimed in claim 1 wherein said housing has a front wall and a rear wall each including a contact surface extending generally transversely of said first wall for being disposed against a transverse corner surface at one end of a distance to be measured, each of said front and rear walls having an exterior housing attachment means, each of said housing attachment means being confined within an area defined by the plane of the adjacent contact surface so as not to extend outwardly of said plane.

11. A roller measure device as set forth in claim 10 wherein said contact surfaces are generally flat and vertically disposed, said front and rear walls each having a recessed lower portion where said associated exterior housing attachment means is secured.

12. A roller measure device as claimed in claim 1 wherein said housing has an exterior end with an outer end surface; and said attachment means comprising an outward projection from said housing outer end surface.

13. A roller measure device as set forth in claim 12 wherein said housing exterior end has a generally upright contact surface and a recessed area, said attachment projection being disposed in said recessed area so as not to extend beyond the plane defined by said upright contact surface.

14. A roller measure device as set forth in claim 13 wherein said recessed area is defined by a downwardly and inwardly inclined exterior surface at a lower portion of said housing exterior end.

15. A roller measure device as set forth in claim 13 wherein said projection comprises a plate-like base portion and a transversely extending retainer portion connected to an outward portion of said base portion.

16. A roller measure device as set forth in claim 15 wherein said receptacle of said handle attachment means is defined between a pair of spaced apart prongs.

* * * * *